United States Patent
Andersson

[15] 3,672,518
[45] June 27, 1972

[54] ARRANGEMENTS IN SILOS FOR STORING VAULT-FORMING MATERIALS

[72] Inventor: Sven A. Andersson, Malmo, Sweden
[73] Assignee: Ingeniorsfirman Nils Weibull AB, Malmo, Sweden
[22] Filed: May 19, 1970
[21] Appl. No.: 38,808

[52] U.S. Cl. .......................................... 214/17 DB, 198/213
[51] Int. Cl. ...................................................... B65g 65/38
[58] Field of Search .................... 214/17 D, 17 DB; 198/213

[56] References Cited
UNITED STATES PATENTS 3,358,856  12/1967  Weibull ............................. 214/17 DB
3,272,316  9/1966  Linde .................................... 198/213
3,458,028  7/1969  Johannessen .......................... 198/213

Primary Examiner—Robert G. Sheridan
Attorney—Beveridge & De Grandi

[57] ABSTRACT

In silos for storing freely running materials with a tendency to form vaults when taken out of such a silo or container through a bottom opening by means of a horizontally rotating scraper, the arrangement of a central vertical rotary screw and preferably means for removing and replacing any broken part of the shaft of such a screw without the need of emptying said container for repair.

4 Claims, 4 Drawing Figures

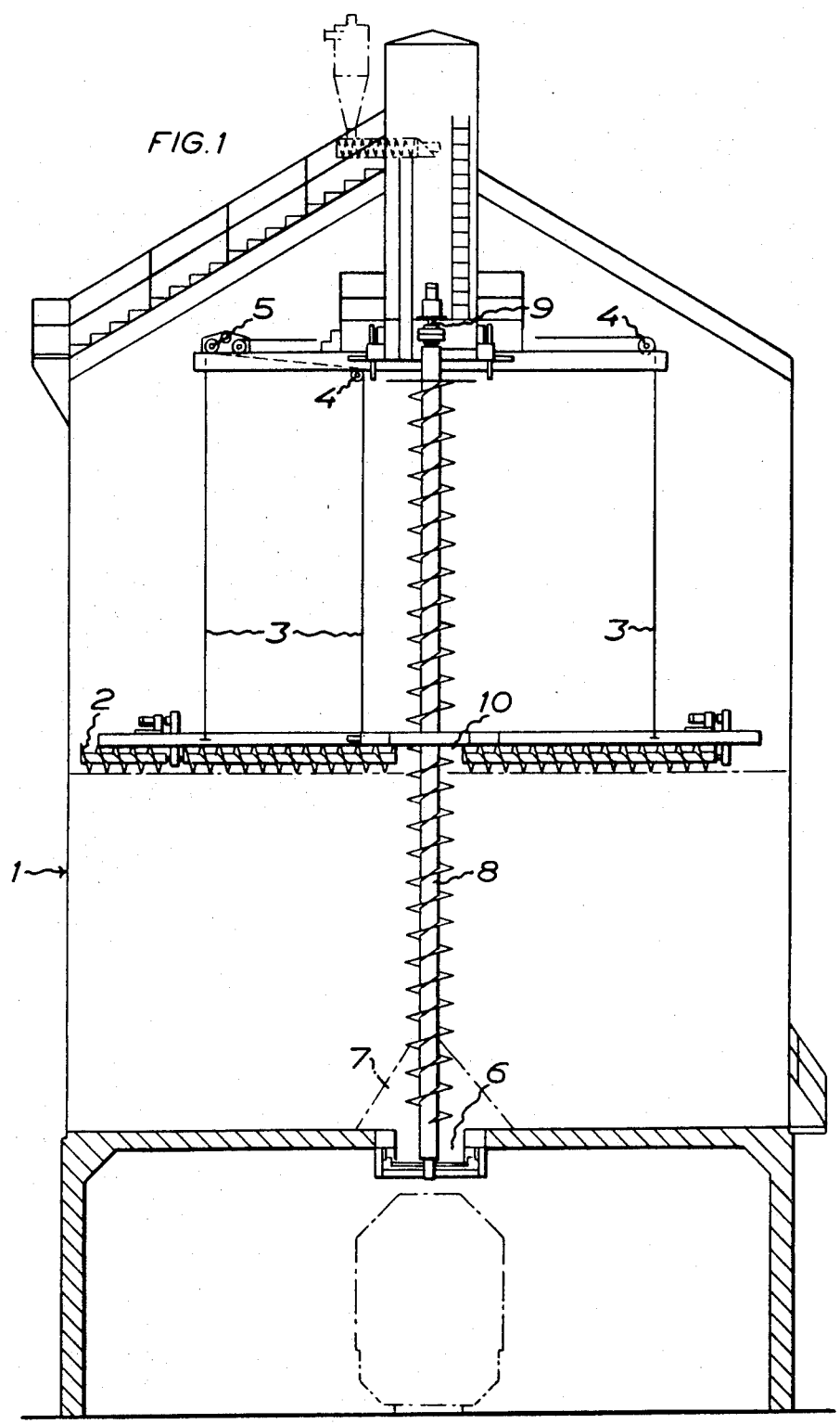

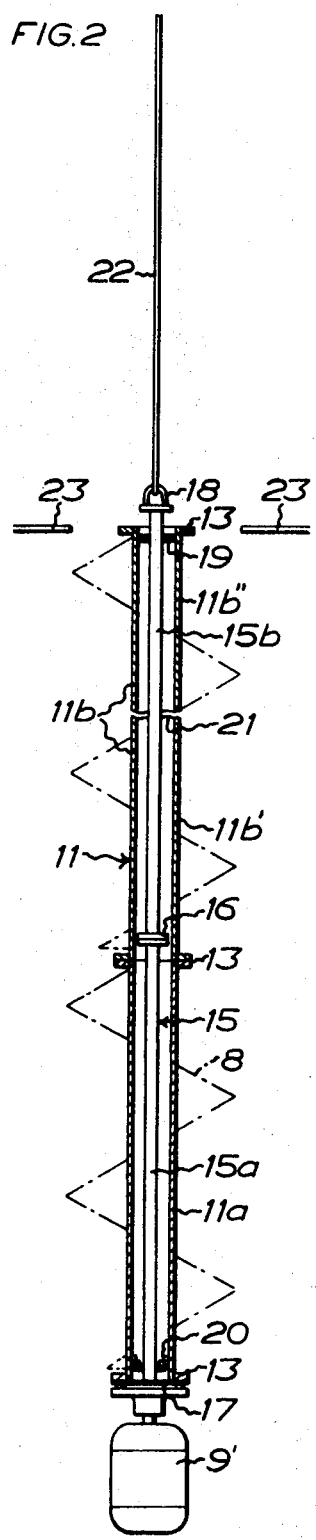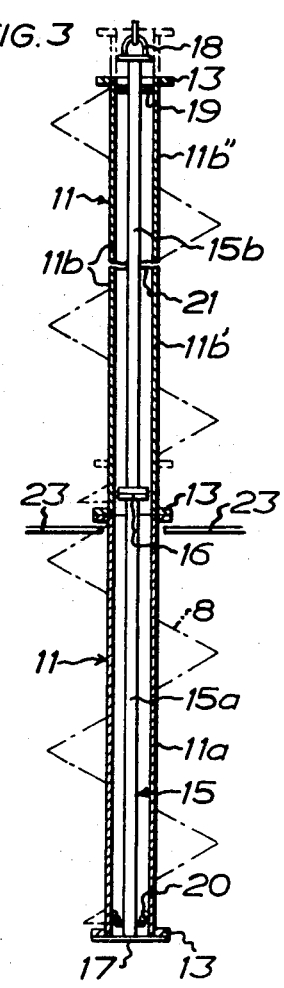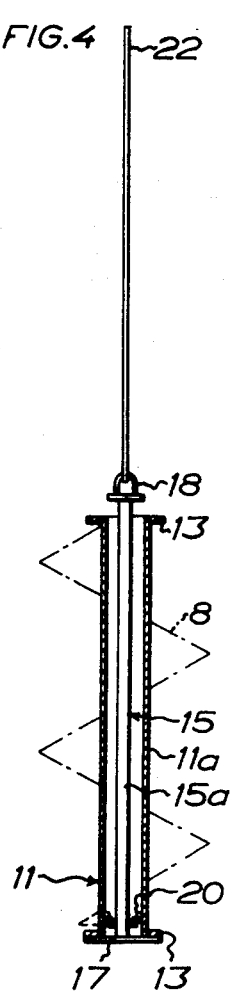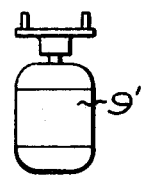

ARRANGEMENTS IN SILOS FOR STORING VAULT-FORMING MATERIALS

The present invention relates to silos or containers for storing freely running materials such as sugar, starch, grain, copra, beans, saw dust, wood chips etc., which when discharged downwardly have a tendency to form vaults, making it difficult to take out the materials from the container.

It is common practice to arrange a horizontal and centrally arranged screw conveyor in silos for evenly distributing the material supplied thereto and for discharging such material from the silo through a central opening in the bottom of said silo.

In the case of vault-forming materials the problem arises that the material forms a vault over the discharge opening in the bottom of the silo and in consequence thereof no material is discharged from the silo. In order to prevent this failing discharge the invention suggests the arrangement of a central vertical conveyor screw extending from the upper part of the silo and down to or even into the bottom discharge opening. With this arrangement any vault-forming over the discharge opening in the bottom of the silo is prevented.

The features of and the advantages gained by the invention are set out in the following, reference being made to the accompanying drawings which by way of example show a silo encompassing the invention.

FIG. 1 shows a silo with a screw according to the invention;

FIGS. 2 to 4 show the means for repairing said screw in case of shaft rupture, the drive motor being shown at the lower end of the conveyor shaft.

In the drawings, reference numeral 1 generally designates a silo having cylindrical form and in a known manner provided with inlet and outlet means for a material to be stored in said silo.

For evenly distributing the stored material and for evenly discharging said material a horizontal rotary screw conveyor 2 is arranged, said conveyor being movable vertically to be in contact with the surface of the material stored in said silo to keep said surface plane. For this purpose the screw conveyor is connected to wires 3 which are connected over rollers 4 to a drive motor 5.

A discharge opening 6 is provided in the bottom of the silo 1. In the illustrated embodiment said discharge opening and the bottom of the silo are arranged at such a height that a railway car can be run beneath the silo for loading.

Now, if the material stored in the silo has a tendency to form a vault over the discharge opening 6 as indicated by the lines 7 the material will not be discharged. To solve this problem the present invention suggests the arrangement of a vertical rotary screw conveyor 8 which conveys the material stored in said silo out through said discharge opening 6. In this way, any vault-forming tendency in the vicinity of the discharge opening is prevented. Said screw is driven by means of a motor 9 arranged in the upper part of said silo above the level of the material stored therein, or by means of a motor 9' arranged at the lower end of the shaft of said conveyor.

The horizontal screw conveyor may comprise a plurality of conveyor arms connected to a common hollow bearing 10 through which the vertical screw conveyor extends.

Due to the length of the shaft of the vertical screw conveyor 8 there is the risk of said shaft breaking, which would disturb the delivery of the goods stored in said silo. In order to overcome such a disturbance the invention further includes the provision of a connecting member which is axially non-displaceable at least in one direction relative to the tubular shaft and which extends from end to end of said shaft and, possibly except at one of the ends of the tubular shaft, is devoid of a non-rotary connection with said shaft to permit, upon rupture of the tubular shaft, rotation of the parts resulting from the rupture in relation to one another and allow withdrawal of the screw conveyor in its entirety from the bulk material.

The screw conveyor 8 illustrated in the drawings comprises a tubular shaft 11. In the present instance said shaft consists of two sections 11a and 11b which have flanges 13 at their ends and are connected together at these flanges with their facing ends. The lower section 11a is coupled to said electric drive motor 9 at its lower end.

In accordance with the invention, a solid shaft 15 is arranged within the tubular shaft 11 coaxially therewith. Said solid shaft 15 likewise comprises two sections 15a and 15b which are connected together by means of flanges 16 with their facing ends. The lower section 15a at its lower end has a flange 17 which is sufficiently large to extend beneath the flange 13 at the lower end of the tubular shaft section 11a and which may be secured to said flange to be axially non-displaceable relative to the tubular shaft, while the upper section 15b at its upper end is formed with a lifting eye 18. The shaft 15 is preferably rotatably mounted in the tubular shaft 11 by means of an upper radial ball bearing 19 and a lower thrust ball bearing 20.

Like the lowermost flange 13, the flange 17 may be connected to the drive motor 9 but since the shaft 15 is rotatable in the tubular shaft 11 — it is non-rotatably connected with the tubular shaft merely at the driven end thereof — no transmission of power from the motor 9 takes place to the screw conveyor 8 by the intermediary of the shaft 15. Should a rupture of the tubular shaft 11 occur for instance at 21 (as shown in FIG. 2) so that the upper section 11b of the tubular shaft 11 is divided into two parts 11b' and 11b'' the shaft 15 can freely rotate relative to the upper part 11b'' since the latter is not carried along any more in the rotary movement of the remaining tubular shaft 11 because of the rupture at 21.

FIGS. 3 and 4 illustrate the procedure for repairing such a rupture of the tubular shaft 11. A lifting cable 22 is secured in the lifting eye 18 at the upper part 11b'' of the tubular shaft section 11b, and by means of said lifting cable 22 the entire screw conveyor 8 is hoisted up in that the screw conveyor is lifted from below by means of the solid shaft 15. After the upper tubular shaft section 11b has been lifted free as shown in FIG. 3, supports 23 placed on fixed parts of the silo structure can be moved in under the flange 13 at the upper end of the tubular shaft section 11a so that this section will remain hanging on the supports 23 while the tubular shaft section 11b and the shaft section 15b are dismounted for permitting repair of the tubular shaft section 11b.

If the rupture is at the lower tubular shaft section 11a but the height in the silo does not permit withdrawal of the screw conveyor 8 in its entirety without being dismounted section by section, a lifting eye 18' may be disposed at the upper end of the shaft section 15a after the sections 11b and 15b have been removed, whereupon the lower section of the screw conveyor can be raised by means of the lifting cable 22, as will appear from FIG. 4.

It will readily be realized that mounting of the screw conveyor after finished repair takes place in the reverse order.

In the embodiment described the flange 17 of the shaft 15 is connected to the flange 13 at the lower end of the tubular shaft 11 and is coupled together with said tubular shaft 11 to the drive motor 9 so that the shaft 15 rotates together with the tubular shaft 11. Naturally, the shaft 15 need not be arranged so as to partake in said rotation, since it does not transmit any drive power from the motor to the screw conveyor, and in the operating condition shown in FIG. 2 the shaft 15 can therefore be entirely devoid of a rotary connection with the tubular shaft 11. As will readily be understood, the essential feature of the invention is that the shaft 15 is mounted in such a manner in the tubular shaft 11 that in case of rupture of the tubular shaft the shaft 15 permits a relative movement between the parts of the tubular shaft resulting from the rupture and allows raising of the screw conveyor 8 in its entirety. A non-rotary connection between the shafts 11 and 15 at one of the ends of the screw conveyor does not prevent such relative movement. Further, a steel wire can be substituted for the solid shaft 15. Therefore the invention is not restricted to the embodiment described above and shown in the drawings but can be modified within the scope of the appended claims.

What I claim and desire to secure by letters patent is:

1. In a silo for storing vault-forming materials, having hollow bearing means at the upper part of the silo, motor means on said bearing means, and unloading means comprising a common horizontal conveyor means in continuous contact with the material stored in said silo, and a central vertical screw conveyor means extending from said hollow bearing means into a bottom opening of the silo, said horizontal conveyor means being suspending from and supported by said hollow bearing means for upward and downward movement of said horizontal conveyor means; the improvement wherein said vertical screw conveyor means comprises a rotatable tubular vertical shaft and a screw thread on the outer side of said shaft and being driven at one end thereof for conveying the stored material out of said silo, an elongated member axially disposed within said tubular shaft and having a lower portion fixed to said tubular shaft for rotation therewith and having an upper portion mounted for rotation relative to said tubular shaft to permit, upon rupture of the tubular shaft, lifting and withdrawing the screw conveyor from the stored material.

2. The combination defined in claim 1, wherein said member disposed within said tubular shaft is connected to said shaft at its lower end and is rotatably mounted in the tubular shaft at its outer end.

3. The combination defined in claim 1, wherein said member disposed within said tubular shaft is connected to said shaft at one end and is rotatably mounted in the tubular shaft at its other end and intermediate its ends.

4. The combination defined in claim 1, wherein said tubular shaft and said member disposed therein each comprise detachably interconnected sections.

* * * * *